F. Cheney.
Doubling, Twisting, and Reeling Thread.
No. 197. Reissued Apr. 29, 1851.
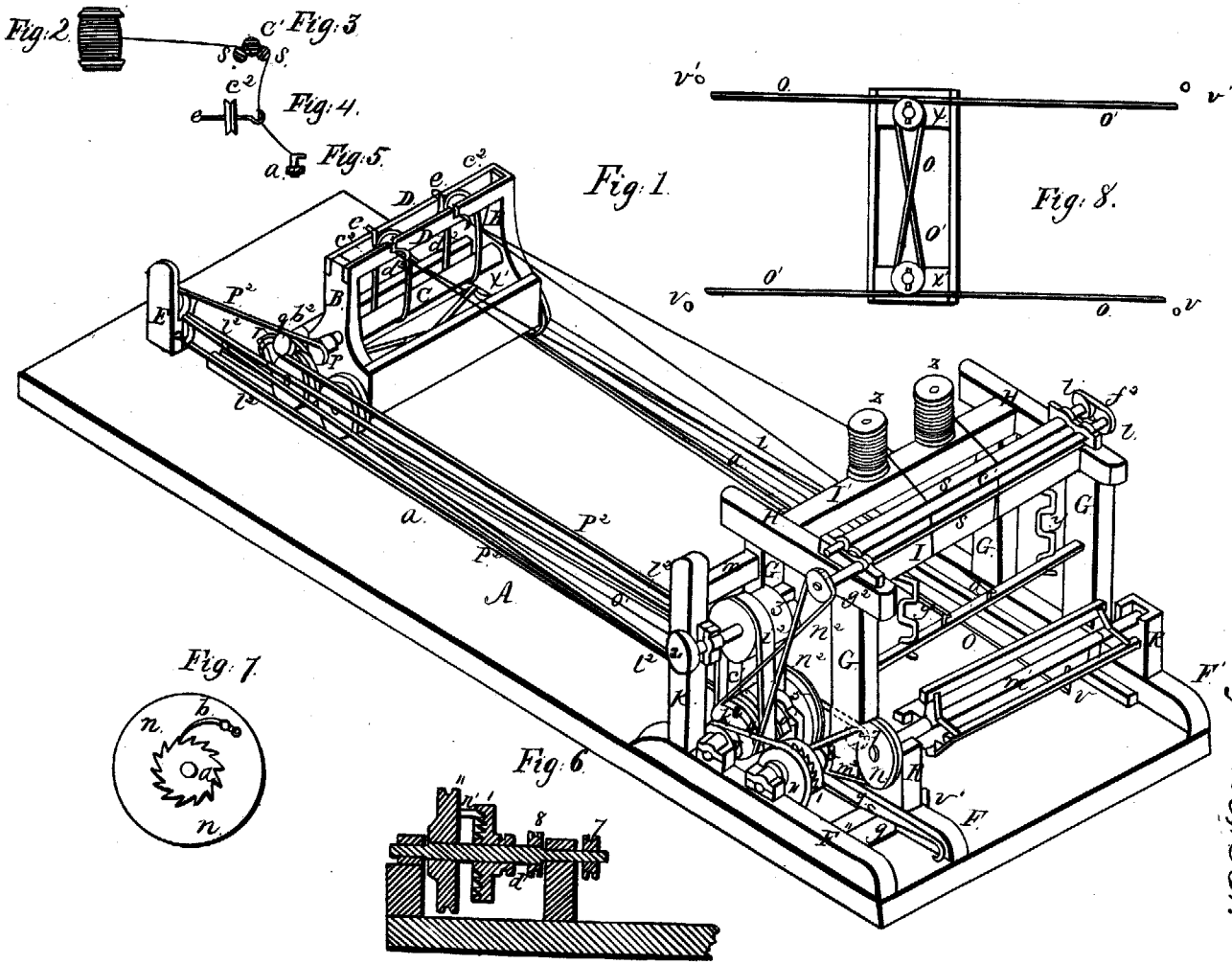

UNITED STATES PATENT OFFICE.

FRANK CHENEY, OF MANCHESTER, CONNECTICUT.

IMPROVEMENT IN MACHINERY FOR DOUBLING, TWISTING, AND REELING THREAD.

Specification forming part of Letters Patent No. 5,328, dated October 9, 1847; Reissue No. 197, dated April 29, 1851.

*To all whom it may concern:*

Be it known that I, FRANK CHENEY, of Manchester, in the county of Hartford and State of Connecticut, have invented a new and useful Machine for Doubling, Twisting, and Reeling Silk or Threads of other Material or Materials; and I do hereby declare that the following is a description of the construction and operation of the said machine, reference being had to the accompanying or annexed drawings, which make a part of this specification, of which—

Figure 1 is a perspective view of the machinery and car after the latter has been drawn out and the twisting of the doubled threads is about to commence. Fig. 2 is a lateral or side view of one of the bobbins. Fig. 3 is a sectional view of the drawing-rollers *s s*, Fig. 1, and a loose roller, *c'*, Fig. 3, lying on top of the silk and rollers *s s*. Fig. 4 is a side view of one of the spindles *e*, Fig. 1, which are in the upper part of the car-frame. Fig. 5 is a view of the catch on the rod *a*, Fig. 1, for fastening one end of the thread. Fig. 6 is a sectional view of the clutch-shaft and its appendages. Fig. 7 is a view of the inner face of the wheel *n*, which is fixed on the end of the shaft of the reel, the said figure showing the catch on the said face, and also the catch-wheel, which is firmly made fast to the shaft of the reel. Fig. 8 is a bottom or under side view of the horizontal wheels connected to and placed under the car of Fig. 1, such figure being also made to exhibit the arrangement of the cords for steadying the car. Figs. 6, 7, and 8 are represented on a larger or different scale than the other figures, and Figs. 2, 3, 4, and 5, in combination or as connected by a red line, show the manner in which the thread passes from each of the bobbins to and between the drawing-rollers, thence through the hook on the end of the spindle attached to the car, thence back to a catch-hook on the bar *a*, Fig 1, in the notched or bent wire or support *y y*, which are under the drawing-rollers, as seen in Fig. 1.

To enable others skilled in the art to make and use my invention, I will proceed to describe its construction and operation.

First lay or construct an ordinary platform, A, Fig. 1, with a railway, $a^2$ $a^2$, similar to those now in use for cotton-mules. Construct a car with two wheels for each rail, such car having two uprights, B B, Fig. 1, one of which is placed near each set of wheels. Between these uprights, and supported by them, is a drum, C, Fig. 1, whose shaft or journal projects through and beyond one of the uprights, and has a band-wheel, *p*, Fig. 1, fixed upon it outside the upright. From the car an arm, $b^2$, projects horizontally and parallel to the drum C, Fig. 1, the said arm being provided with a band-wheel, *q*, Fig. 1, which is so applied to it as to be capable of freely revolving around on it. Under, and connected to the car at each end of it, is a horizontal double-grooved band wheel, *x*, Figs. 1 and 8. From the front of the car projects an arm having an elbow, the said arm extending beyond the car-wheels, as seen at *r*, Fig. 1. The uprights B B spring from each end of the car and are connected at their upper ends by two cross-pieces, D D, Fig. 1. These cross-pieces have an interval or space between them and support two or any other suitable number of spindles, *e e*, Fig. 1, each of which has a hook projecting from it, as seen in the drawings, and for the purpose of receiving upon it and retaining the silk or thread to be twisted. Around the grooved pulley $c^2$ of each of the spindles *e e* and the drum C, Fig. 1, an endless cord or band, $d^2$, is extended, and is for the purpose of communicating motion to the spindle. At each end of the railway, and on the inside of it, are two permanent stakes, *v v'*, Fig. 1, to which the cords *o o'* seen in Fig. 8, which pass around the horizontal wheels *x x'* under the car, are respectively fastened, each cord, after being carried around one of the wheels, being made to pass to the opposite side of the other one and around or partially about it, and thence to the pin *v'* at the other end of the railway, all as seen in Fig. 8, the cords crossing one another diagonally between the wheels *x x*, as denoted in the said figure. The ends of the same cord are thus attached to pins *v v'*, which are diagonally opposite at the ends of the railway. At the outer end of the railroad or extremity of the track, and on the same side as that from which the band-wheel *p* of the car projects, is a vertical stationary post, E, Fig. 1, which post supports two band-wheels, 1 and 2, Fig. 1, one of which is arranged above the other, while the upper one, 1, Fig. 1, is placed in a vertical plane, which is outside of that of the other, 2, Fig. 1.

We will now describe the stationary frame-work and machinery, and afterward explain the operation of the whole. At one end of the rail track, and parallel to it, and outside of the rails, respectively, we lay two sleepers, Fig. 1, F F′, and elevate upon each of them two uprights, G G. The two uprights on one side are connected by a cross-piece, H, fastened over the tops of them; and so with those on the opposite side, they are joined by another cross piece H in a similar manner, and fastened to them in the same way. Two beams, I I′, placed at convenient or proper distances apart and parallel to each other, are fastened to the cross-pieces H H and at right angles to the direction of the railroad. Upon the cross-piece I′ nearest the car are spindles, upon which spools or bobbins *z z* are placed, and around which they revolve. Above and parallel to the other cross-piece, I, are placed two rollers, *s s*, Fig. 1, they being arranged in the same horizontal plane and supported in suitable bearings, such as will admit of their free revolutions on their respective axes. Each of the said rollers is terminated by a band-wheel, as seen at *l l*, Fig. 1, around both of which band-wheels an endless coupling-cord $f^2$ passes. The opposite end of one of these rollers is also terminated by a band-wheel $g^2$, Fig. 1. At a convenient distance from the sill-piece F, Fig. 1, which forms a part of the bed of the frame-work, another sill-piece, F″, Fig. 1, of the same length, is placed parallel to it, and the two are connected by a suitable number of cross-pieces, one of which is seen at *g*, Fig. 1, and as resting upon the common platform A. On the inner or car end of the sill F″ an upright, K, Fig. 1, is erected, the said upright being connected at or near its top with the main frame, and by means of a horizontal cross piece, *m*, Fig. 1. The uprights G and K, Fig. 1, support (by means of boxes) near their upper ends a horizontal shaft, on which is fastened a large drum, 3, Fig. 1, and on the outer end of the said shaft, where it projects beyond the frame, a driving-drum, 20, Fig. 1, is fixed. Under the above shaft is another shaft resting in boxes placed and fixed on the sill-pieces F F″, Fig. 1, of the frame. This lower shaft has on its inner end, which end projects beyond the sill-piece F, Fig. 1, and toward the sill-piece F, a groove-wheel, 5, Fig. 1, which is made fast to it. Next to this wheel, and between the sill-pieces F F″ is a drum, *a′*, Fig. 1, which is fixed and fastened to the shaft. By the side of this drum, and at or near the middle of the shaft, is a drum, *c′*, Fig. 1, which revolves freely upon the shaft. Outside of the drum *c′*, Fig. 1, and on the same shaft and between the sill pieces F″ F, is another drum, 4, Fig. 1, having a groove-wheel, △, Fig. 1, on its outer end. This drum and wheel revolve freely on the shaft which supports them. Immediately in rear of the shaft just described and supported by the same sill-pieces F″ F, Fig. 1, is another shaft, having fastened on its inner end and above and between the sills F and F′, Fig. 1, a band or groove-wheel, 7, Fig. 6, which is fastened to it. Inside of this band-wheel, and between the sills F F″, Fig 1, is another groove or band wheel, 8, Figs. 1 and 6, which is also fastened to the shaft. Next to this band-wheel, and in the middle of the same shaft, is a clutch-wheel having cogs on its outer side, as seen at 1, Fig. 6, which cog-wheel revolves with the shaft, but is adapted to it so as to be capable of sliding longitudinally on the shaft, and this by counter-sinking a key lengthwise with and into the shaft *d′*, Fig. 6, and having part of it to project above the shaft and into a corresponding groove or mortise made in the hub of the cog-wheel 1, Fig. 6. Outside of this wheel 1, Fig. 6, and toward the sill-piece F″, Fig. 1, is a grooved or band wheel, 11, Figs. 1 and 6, which revolves freely around or on the shaft. This grooved wheel has a pin, *n′*, projecting horizontally from its inner surface and toward the cogged surface of the wheel 1, Fig. 6. By means of a forked shifting-lever, 9, Fig. 1, fixed in rear of this cog-wheel 1, Fig. 6, the said cog-wheel is moved toward the band-wheel 11, Fig. 1, and against the pin *n′*, Fig. 6, and so as to interlock it with the cogged wheel and clutch the band-wheel 11 to it, and thus make the said wheel 11 revolve with the shaft. The wheel 1, Fig. 6, may be forced inward and free from contact with wheel 11, and so that wheel 11 will revolve freely around or upon the shaft. In rear of the main frame, and springing upward from the sill pieces F F′, are two short uprights, R R, the upper ends of which have mortises in them. These uprights support the shaft *m′* of a reel, which is arranged between them and immediately in rear of the car. That end of the shaft *m′*, Fig. 1, of the reel which is toward the drums and wheels just described projects beyond its support and has a catch-wheel, as seen at *a*, Fig. 7, fixed to it. Upon the end of the shaft *m′* of the reel and outside of this catch-wheel *a*, Fig. 7, is a band-wheel, *n*, Figs. 1 and 7, which revolves freely around or upon the shaft. On the inner surface of this band-wheel *n*, Fig. 7, is a catch, *b*, Fig. 7, which is so placed and pointed to the rear that the wheel *n* can revolve freely around or upon the shaft *m′* and toward the other end of the track in a forward direction of the car. In a reversed motion the catch *b* comes in contact with the catch-wheel *a*, Fig. 7, on the shaft of the reel, and thereby forces the reel to revolve with it. Supported by the main frame and projecting downward from it, and under the rollers *s s*, Fig. 1, are two arms or wires, *y y*, Fig. 1, so bent as to form elbows, or have recesses in them at different distances, between two of which opposite elbows or recesses is placed a small bar, *a*, Fig. 1, to which the end of the article to be twisted is tied or catched. These wires *y y*, Fig. 1, are called "guides," the bar *a* being placed in the lower elbows or recesses when the car is to be run out, and in the upper ones and close to the rollers *s s*, Fig. 1, when the twisting operation is about to be commenced. To put the whole in operation, power is applied to and to rotate the driving-drum 20, Fig. 1. This gives motion to the drum 3, Fig. 1, which is coupled by a band, $i^2$, with the drum 4, Fig. 1. The drum 4, Fig. 1, is coupled with the groove-wheel 11, Fig. 1, by an endless cord, $k^2$, which works or passes around the latter and the groove-wheel △, before described. Motion is given to the shafts of the wheel 11 by clutching the wheels 1 and 11, Fig. 6, together. The wheel 7, Fig. 6, (being fast to the shaft,) gives motion to the car and drives it out, and this by means of the cord $l^2$, which passes around the said wheel 7 and the wheel 2, Fig. 1, placed at the other end of the track. Both ends of this cord are fastened to an arm, *r*, Fig. 1, projecting from the front of the car. The groove-wheel 8, Figs. 6 and 1, is coupled with the groove-wheel *n*, Fig. 1, of the reel by means of an endless band or cord, $m^2$, and as the catch on the wheel *n* is toward the rear, the said wheel *n* will revolve freely with the wheel 8 during its forward motion or rotations, and this without catching into the teeth of the wheel *a* so as to produce any rotary movement of the reel. There is an endless crossed cord, $n^2$, which, passing around a groove in the periphery of drum 4, and also around the pulley $g^2$, imparts motion to the rollers *s s*. These rollers are coupled at their other ends by an endless cord $f^2$, which passes around the peripheries of the grooved wheels *l l* at those ends. A small roller, *c'*, Fig. 3, is laid on top of the rollers *s s*, Figs. 1 and 3, in order to keep the silk or thread from paying out or being delivered too fast from the bobbins. On the car having been run out, the twisting is to be forthwith commenced and carried out. This is accomplished by shifting or moving the band which is on the drum 3, Fig. 1, until it shall connect the drums 3 and *a'*, Fig. 1. The bar *a*, Fig. 1, is now or has previously been put into the upper elbows of the *y y* wires. The drum *a'*, being fastened to the shaft, gives a motion to the grooved wheel 5, Fig. 1, of that shaft. An endless cord, $p^2$, is passed around this wheel 5, and thence under and partially around the wheel *q* on the arm of the car; next under and partially around and over the wheel *p*, Fig. 1, on the shaft of the drum *c* of the car; thence forward to and partly around wheel 1 of post E, and finally back to wheel 5. Motion being imparted to shaft *c* and the endless cords passing around it and the wheels of the spindles in the upper frame of the car, a motion will be given to the spindles, and thus the material or thread will be twisted. The threads leading directly from the bobbins are next cut just above the bar *a*, Fig. 1, and brought down and tied or catched to the said bar, which is next removed from its supports *y y* and inserted in or fastened to the reel, and by the side of one of its bars. The band or cord which passes around the rollers *q p* of the car is next taken off and the car run back or toward the reel by hand. The band around the drum 3 is removed from the drum *a'* onto that of *c'*, which has a free motion around the shaft, and is unconnected with anything, and this removal must take place before the car is run back by hand, as before described. This being effected we next run the car back. The cord from the car which passes around the wheel 7, Fig. 6, gives motion to this wheel, the wheels 1 and 11 having been first uncoupled. The wheel 7 gives motion to the wheel 8, and the latter, by means of the coupling band, imparts motion to the wheel *n* on the shaft of the reel. The motion of the wheel *n* being toward the rear, the catch on the surface of the wheel fastens into the fixed catch-wheel *a*, Fig. 7, on the shaft of the reel, and thereby causes the reel to revolve. The car is kept steady in running out and returning by means of the arrangement of cords underneath it, as seen in Fig. 8, which has been already described. The endless cord which produces motion of the drum or shaft C, so as to impart motion to the spindles and produce the twisting operation, passes around the wheel 5, Fig. 1, the stationary wheel 1 of the post E, Fig. 1, drum *p* of the shaft C, Fig. 1, thence over and under the wheel *q*, on the arm of the car, thence to the wheel 5, Fig. 1, as hereinbefore described. The cord by which the car is run out, passes from the car, around the wheel 7, Fig. 6, thence forward around the wheel 2 of the post E, and thence to the car, where it is fastened.

In machines in general use the threads are doubled by one machine. Next, they are removed to another one and thereby twisted, the reeling process being a subsequent operation. In the above-described machine the material is doubled, twisted, the spindles run in, and the reeling effected while they are in the act of running in, all being accomplished by the same machine.

Although I have described my machine or invention under sundry peculiar constructions of its operative parts, it is evident that these may be varied in form or arrangement, or that other well-known mechanical contrivances known as "equivalents" may be substituted and not change the principle or character of novelty peculiar to my invention.

I would remark that previous to the operation of doubling the threads they are taken from their respective bobbins and led between the roller *c'* and the two rollers, *s s*. From these rollers they are passed through the hooks of their respective spindles, and are subsequently tied to the hooks of the bar *a*. It should be borne in mind that such a disposition of the thread is made while the spindle-carriage is run in, or is close up to the drawing-rollers. The subsequent movement of the carriage in a direction away from the drawing-rollers causes the spindles to drag or draw upon the threads in such manner as to produce the doubling of each of them.

What I claim as my invention, and desire to secure by Letters Patent, is—

The above described combination of doubling, twisting, and reeling mechanism or elements constructed, applied, and operating together, substantially as herein described, whereby I am able to double, twist, and reel each thread by the same machine, substantially in the manner as hereinbefore specified.

In testimony whereof I have hereto set my my signature this 10th day of February, A. D. 1851.

FRANK CHENEY.

Witnesses:
CHARLES CHENEY,
WILLIAM SCOTT.